(12) United States Patent
Lee et al.

(10) Patent No.: US 10,877,610 B2
(45) Date of Patent: Dec. 29, 2020

(54) DISPLAY DEVICE INCLUDING SENSING UNIT AND SENSING METHOD USING SAME

(71) Applicant: LG Display Co., Ltd., Seoul (KR)

(72) Inventors: Soyoung Lee, Seoul (KR); SeungHwan Shin, Jeollabuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 26 days.

(21) Appl. No.: 16/102,942

(22) Filed: Aug. 14, 2018

(65) Prior Publication Data
US 2019/0056822 A1  Feb. 21, 2019

(30) Foreign Application Priority Data
Aug. 16, 2017 (KR) .......................... 10-2017-0103755

(51) Int. Cl.
| | | |
|---|---|---|
| *G06F 3/044* | (2006.01) | |
| *G06F 3/047* | (2006.01) | |
| *G06F 3/041* | (2006.01) | |
| *G06F 3/038* | (2013.01) | |
| *G06F 3/042* | (2006.01) | |

(52) U.S. Cl.
CPC ............ *G06F 3/044* (2013.01); *G06F 3/0386* (2013.01); *G06F 3/042* (2013.01); *G06F 3/047* (2013.01); *G06F 3/0412* (2013.01); *G06F 3/0416* (2013.01); *G02F 2201/121* (2013.01); *G02F 2201/123* (2013.01); *G06F 2203/04106* (2013.01); *G06F 2203/04112* (2013.01)

(58) Field of Classification Search
CPC ................................................ G06F 3/041–047
See application file for complete search history.

(56) References Cited

U.S. PATENT DOCUMENTS

| | | | |
|---|---|---|---|
| 2012/0182277 A1* | 7/2012 | Jeong ..................... | G06F 3/0412 345/207 |
| 2012/0200539 A1* | 8/2012 | Sato ........................ | G06F 3/042 345/175 |
| 2014/0085267 A1* | 3/2014 | Ahn ....................... | G06F 3/0412 345/175 |

FOREIGN PATENT DOCUMENTS

| | | |
|---|---|---|
| CN | 104850292 A | 8/2015 |
| JP | 2009064074 A | 3/2009 |
| TW | 201005607 A | 2/2010 |
| TW | 201346516 A | 11/2013 |

\* cited by examiner

*Primary Examiner* — Hang Lin
(74) *Attorney, Agent, or Firm* — Polsinelli PC

(57) ABSTRACT

Provided are a display device and a sensing method thereof that include: a display panel comprising a plurality of pixels; a first sensing unit configured to detect a touch of the display panel and output a first sensing signal; a second sensing unit configured to detect light and output a second sensing signal; a sensing driver IC configured to output the first sensing signal and the second sensing signal received from the first sensing unit and the second sensing unit as sensing voltages; and a controller configured to divide the sensing voltages received from the sensing device IC into the first sensing signal and the second sensing signal.

16 Claims, 14 Drawing Sheets

DISPLAY DEVICE INCLUDING SENSING UNIT AND SENSING METHOD USING SAME

CROSS REFERENCE TO RELATED APPLICATION

This application claims priority from Korean Patent Application No. 10-2017-0103755, filed on Aug. 16, 2017, which is hereby incorporated by reference in its entirety for all purposes as if fully set forth herein.

BACKGROUND

Field of the Disclosure

The present disclosure relates to a display device, and more particularly, to a display device including a sensing unit and a sensing method using the same. Although the present disclosure is suitable for a wide scope of applications, it is particularly suitable for detecting both a touch and light at a sensing unit of the display device.

Description of the Background

With the development of the information society, display devices for displaying images are being increasingly required in various forms, and various types of display devices, such as Liquid Crystal Display (LCD) devices, plasma display devices, and Organic Light Emitting Display (OLED) devices, are utilized.

The display device may operate by receiving a user command through various input devices such as a keyboard and a mouse, and input devices for intuitively and conveniently inputting the user command by touching a screen of the display device are being developed.

Further, the display device is used in various environments, and it is required to generate an input signal of the display device through a device such as a pointer.

Accordingly, a display device including a sensing unit for detecting both a touch and light is needed.

SUMMARY

An aspect of the present disclosure is to provide a display device including a sensing unit for detecting a touch and light, and a sensing method using the same.

In accordance with an aspect of the present disclosure, a display device is provided. The display device includes: a display panel comprising a plurality of pixels; a first sensing unit configured to detect a touch of the display panel and output a first sensing signal; a second sensing unit configured to detect light and output a second sensing signal; a sensing driver IC configured to output the first sensing signal and the second sensing signal received from the first sensing unit and the second sensing unit as sensing voltages; and a controller configured to divide the sensing voltages received from the sensing driver IC into the first sensing signal and the second sensing signal.

In accordance with another aspect of the present disclosure, a display panel is provided. The display panel includes: a plurality of pixels configured to display an image according to voltages applied to a first electrode and a second electrode; a first signal line configured to transfer a first driving signal to the second electrode and receive a first sensing signal corresponding to the first driving signal from the second electrode; and a second signal line connected to the first signal line and the photo transistor and configured to receive a second sensing signal from the photo transistor.

In accordance with a further aspect of the present disclosure, a sensing method of detecting a touch and light by a sensing unit comprising a photo sensor is provided. The sensing method includes: generating sensing voltages in accordance with a first sensing signal corresponding to a touch and a second sensing signal corresponding to light; detecting the sensing voltage; and identifying a touch by distinguishing the first sensing signal and the second sensing signal through the sensing voltages.

According to the present aspects, it is possible to provide a display device including a sensing unit for detecting a touch and light, and a second method using the same.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1A:
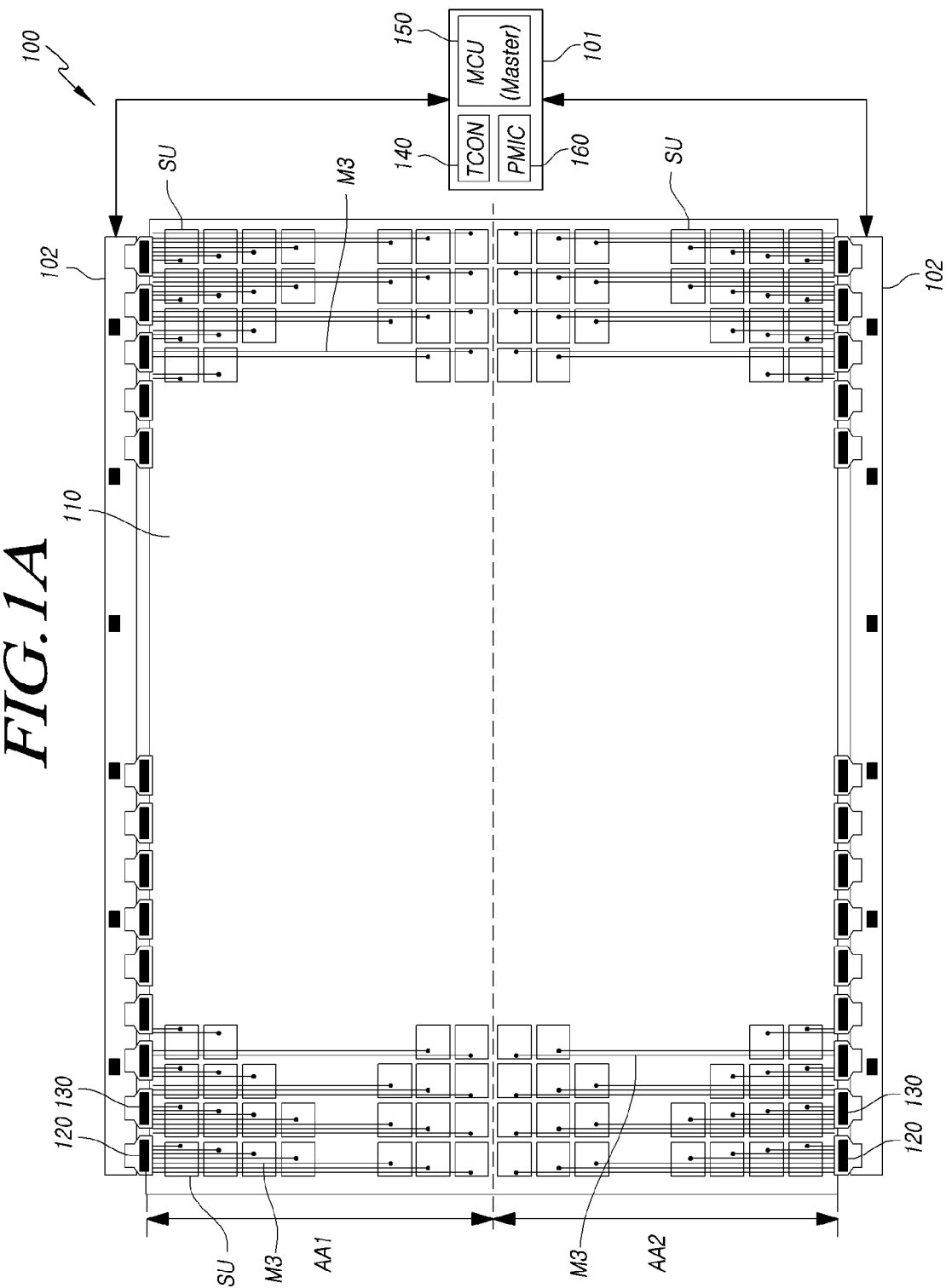
FIG. 1A is a schematic diagram illustrating an aspect of a display device according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1B:
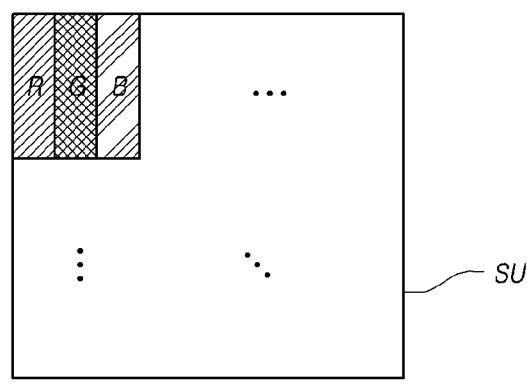
FIG. 1B is a conceptual diagram illustrating an aspect of the relation between a sensing unit and subpixels illustrated in FIG. 1A.
Figure 1C:
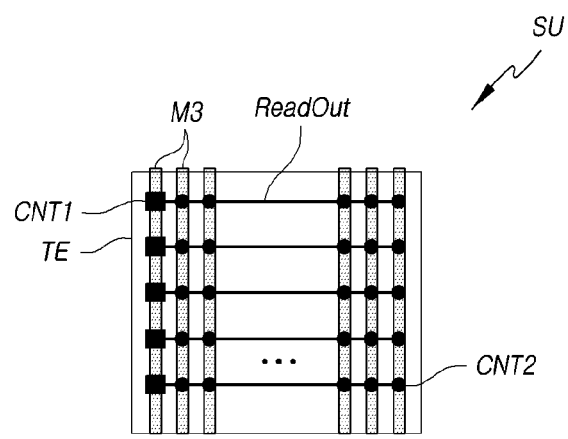
FIG. 1C is a conceptual diagram illustrating an aspect of the connection relation of the sensing unit.

FIG. 1A is a schematic diagram illustrating an aspect of a display device according to the present disclosure, FIG. 1B is a conceptual diagram illustrating an aspect of the relation between a sensing unit and sub pixels illustrated in FIG. 1A, and FIG. 1C is a conceptual diagram illustrating an aspect of the connection relation of the sensing unit.

Referring to FIG. 1A, a display device 100 may include a display panel 110, a plurality of driving driver ICs 120, a plurality of sensing driver ICs 130, a first controller 140, a second controller 150, and a power controller 160. The first controller 140 may be a timing controller, the second controller 150 may be a micro controller unit (MCU), and the power controller 160 may be a power management integrated circuit (PMIC).

A sensing unit including a plurality of sensing units (SU) for detecting a touch in an active area (AA), in which an image displayed, may be arranged on the display panel 110. The sensing unit may include a first sensing unit for detecting a touch of the display panel 110 and outputting a first sensing signal, and a second sensing unit for detecting light and outputting a second sensing signal. When the size of the display panel 110 is large, the display panel 110 may be divided into two areas including upper and lower areas (AA1 and AA2), and the plurality of driving driver ICs 120 and the plurality of sensing driver ICs 130 may be respectively arranged on an upper part and a lower part of the display panel 110. However, the present disclosure is not limited thereto. Further, a plurality of sub pixels (R, G, and B) illustrated in FIG. 1B may be arranged on the lower part of one sensing unit (SU). The plurality of sub pixels (R, G, and B) may emit light according to a data signal and a gate signal. Further, each of the plurality of sub pixels (R, G, and B) may include a pixel electrode. The sensing unit (SU) may include a touch electrode. The touch electrode may be a common electrode corresponding to the plurality of sub pixels (R, G, and B). Further, the sensing unit (SU) may include a photo sensor for detecting light. The photo sensor may be a photo transistor.

Accordingly, the display panel 110 may detect a touch and radiated light. Here, the touch may mean a touch on the display panel 110 by a hand or a stylus pen. The touch may include hovering on the display panel 110 by a hand or a stylus pen. Further, the radiated light may be light, which is radiated from a device, such as a laser pointer, and reaches the display panel 110.

The first controller 140, the second controller 150, and the power controller 160 may be arranged on a first board 101, and the plurality of driving driver ICs 120 and the plurality of sensing driver ICs 130 may be arranged on a second board 102. The number of plurality of driving driver ICs 120 and plurality of sensing driver ICs 130 may be determined according to the size and the resolution of the display panel 110.

The first controller 140 may control the plurality of driving driver ICs 120 and supply an image signal to the driving driver ICs 120. The second controller 150 may control the plurality of sensing driver ICs 130 and allow the sensing driver ICs 130 to supply a first driving signal and a second driving signal. Further, the second controller 150 may detect a touch location or a location, from which light is radiated, by receiving a sensing voltage corresponding to a sensing signal from the sensing driver ICs 130. The power controller 160 may receive power from the outside, and may generate and supply power supplied to the display panel 110, the plurality of driving driver ICs 120, the plurality of sensing driver ICs 130, the first controller 140, and the second controller 150. However, the present disclosure is not limited thereto.

Further, a plurality of first signal lines (M3) may be arranged on the display panel 110. The plurality of first signal lines (M3) may be connected to the sensing unit (SU). The sensing unit (SU) may include touch electrodes, and the touch electrodes may be overlappingly arranged on a layer different from that on which the plurality of first signal lines (M3) are arranged, and connected with the plurality of first signal lines (M3) through a first contact hole (CNT1) formed on at least one position.

Further, as illustrated in FIG. 1C, one sensing unit (SU) may include touch electrodes (TE) connected to the first signal lines (M3) through first contact holes (CNT1) and a plurality of second signal lines (ReadOut) connected to the first signal lines (M3) through second contact holes (CNT2). In addition, the second signal lines (ReadOut) may be connected to a photo transistor (not shown) to receive a second sensing signal generated by the photo transistor. Accordingly, one sensing unit (SU) may include the touch electrode for detecting the touch and the photo transistor for detecting the radiated light, and thus sense both the touch and the light. Further, all second signal lines are connected to all first signal lines (M3) through the second contact holes (CNT2), but the present disclosure is not limited thereto. Here, the touch electrode (TE) may be referred to as a first sensing unit, and the photo transistor may be referred to as a second sensing unit. Further, the touch electrode (TE) may be a common electrode corresponding to a plurality of pixels.

Figure 2:
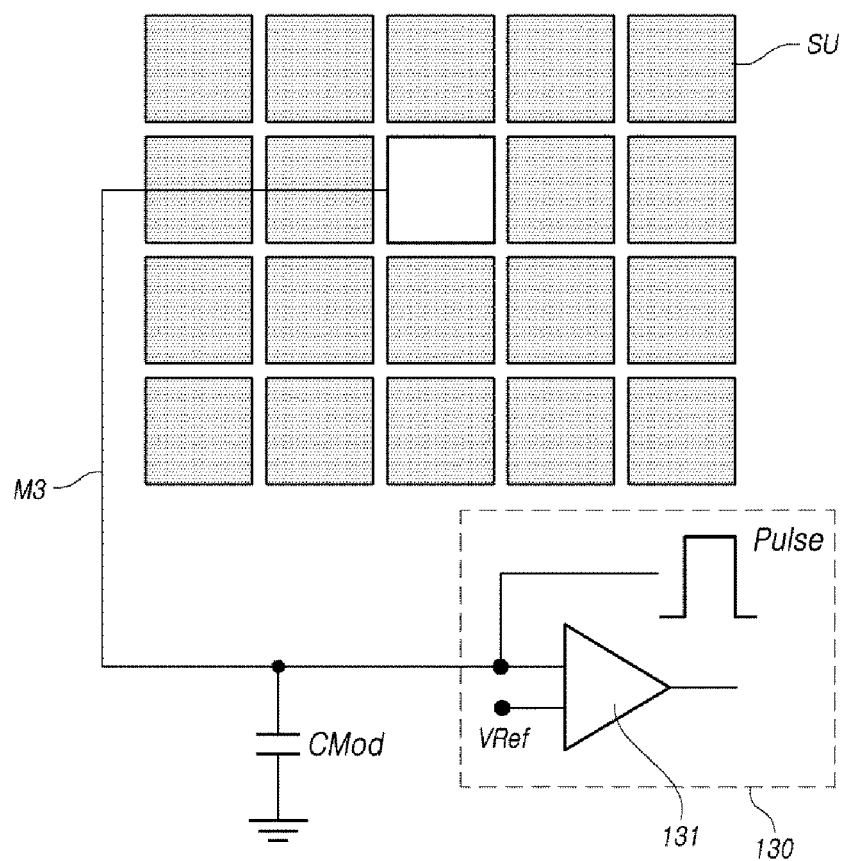
FIG. 2 is a conceptual diagram illustrating an aspect of a sensing type in the display device according to the present disclosure.

FIG. 2 is a conceptual diagram illustrating an aspect of a sensing type in the display device according to the present disclosure.

Referring to FIG. 2, a plurality of sensing units (SU) are arranged, and each touch electrode may be connected to the first signal line (M3) and the sensing driver IC 130. Although it is illustrated that one sensing unit (SU) is connected to one first signal line (M3), it is only for description and the sensing unit (SU) connected to the signal line refers to a sensing unit (SU) to which a driving signal is being applied.

The driving signal in a pulse wave form may be applied to the sensing unit (SU) through the first signal line (M3). The sensing unit (SU) may be driven when receiving the driving signal. The sensing unit (SU) may include a touch electrode and a photo transistor. In the driving signals, a driving signal for driving the touch electrode may be referred to as a first driving signal and a driving signal for driving the photo transistor may be referred to as a second driving signal. A voltage level of the first driving signal may be different from a voltage level of the second driving signal.

Further, the voltage level of the second driving signal may be higher than the voltage level of the first driving signal.

In addition, the sensing unit (SU) may output a sensing signal according to the driving signal. The sensing signal may be a first sensing signal transmitted from the touch electrode or a second sensing signal transferred from the photo transistor. The first sensing signal may be directly transferred to the first signal line (M3), and the second sensing signal may be transferred to the first signal line (M3) via the second signal line (ReadOut). The sensing signal transferred to the first signal line (M3) may be transferred to the sensing driver IC 130. The sensing driver IC 130 may include an integrator 131, and may receive the sensing signal to generate a sensing voltage. For example, the integrator 131 may generate the sensing voltage based on the sensing signal transferred from the first signal line (M3) and a reference signal (VRef). The sensing voltage may be generated according to the first sensing signal or the second sensing signal. And the capacitor (CMod) is a capacitor for the first sensing signal. Since the first sensing signal and the second sensing signal have different voltage levels, sensing voltages may be different from each other. Further, the voltage level of the second sensing signal may be higher than the voltage level of the first sensing signal.

Figure 3A:
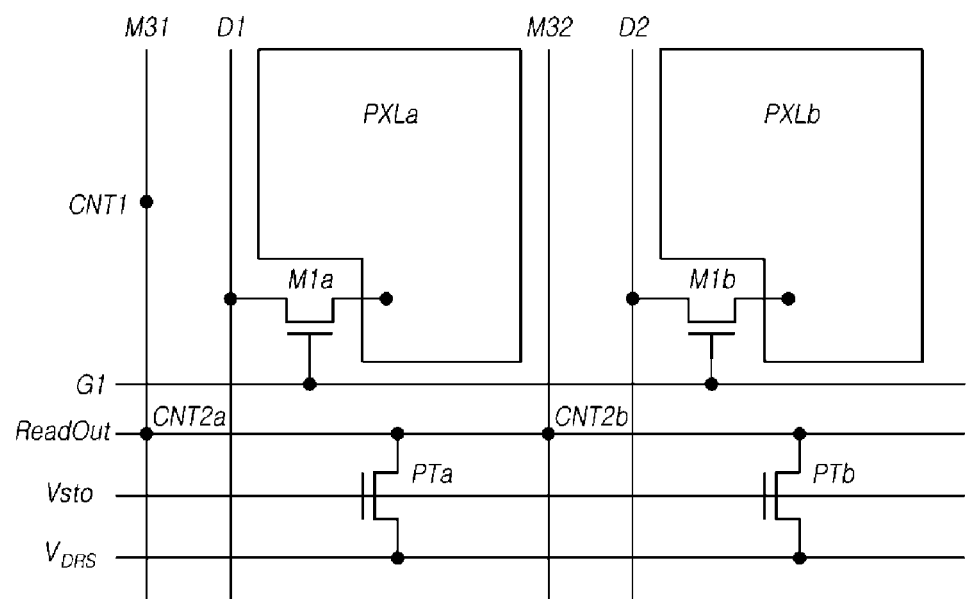
FIG. 3A is a circuit diagram illustrating an aspect of the display according to the present disclosure.

FIG. 3A is a circuit diagram illustrating an aspect of the display according to the present disclosure.

Referring to FIG. 3A, the display device may include data lines (D1 and D2) extending in a first direction and transferring a data signal, and first signal lines (M31 and M32) for transferring a first driving signal and a first sensing signal in parallel to the data lines (D1 and D2). Further, the display device may include a gate line (G1) extending in a second direction and applying a gate signal, a second signal line (ReadOut) parallel to the gate line (G1), a first power line (Vsto) for transferring a first voltage in parallel to the gate line (G1), and a third signal line ($V_{DRS}$) for supplying a second driving signal in parallel to the gate line (G1).

Driving transistors (M1a and M1b) may be arranged in an area at which the data lines (D1 and D2) and the gate line (G1) intersect. Further, the driving transistors (M1a and M1b) may be connected to pixel electrodes (PXLa and PXLb). The pixel electrodes (PXLa and PXLb) are not limited to the illustrated form. First electrodes of the driving transistors (M1a and M1b) may be connected to the data lines (D1 and D2) and second electrodes thereof may be connected to the pixel electrodes (PXLa and PXLb). Further, gate electrodes of the driving transistors (M1a and M1b) may be connected to the gate line (G1).

In addition, the first signal lines (M31 and M32) may be connected to the touch electrode (TE) arranged on the upper part through the first contact hole (CNT1), and the first driving signal may be transferred to the touch electrode (TE) through the first signal lines (M31 and M32). The first sensing signal may be transferred from the touch electrode (TE) to the first signal lines (M31 and M32) according to the first driving signal.

The display device may include photo transistors (PTa and PTb) in which a first electrode is connected to the third signal line ($V_{DRS}$), a gate electrode is connected to the first power line (Vsto), and a second electrode is connected to the second signal line (ReadOut). A first voltage transferred through a first power line (Vsto) may be lower than a threshold voltage of the photo transistor (PTa and PTb). Further, the first voltage may be −5V. A second driving signal transferred through a third signal line ($V_{DRS}$) may be transferred in a pulse wave form. The photo transistors (PTa and PTb) may maintain an off state by the first voltage.

However, the photo transistors (PTa and PTb) may be turned on when light is radiated. When the light is radiated and thus the photo transistors (PTa and PTb) are turned on, a second sensing signal corresponding to the second driving signal transferred through the third signal line ($V_{DRS}$) may be transferred to the second signal line (ReadOut).

The first signal lines (M31 and M32) and the second signal line (ReadOut) may be connected through second contact holes (CNT2a and CNT2b), respectively. Since the first signal lines (M31 and M32) are connected to the second signal line (ReadOut) and the second signal line (ReadOut) is connected to the photo transistors (PTa and PTb), the first sensing signal transferred from the first signal lines (M31 and M32) and the second sensing signal transferred from the photo transistors (PTa and PTb) may be transferred to the second signal line (ReadOut).

Figure 3B:
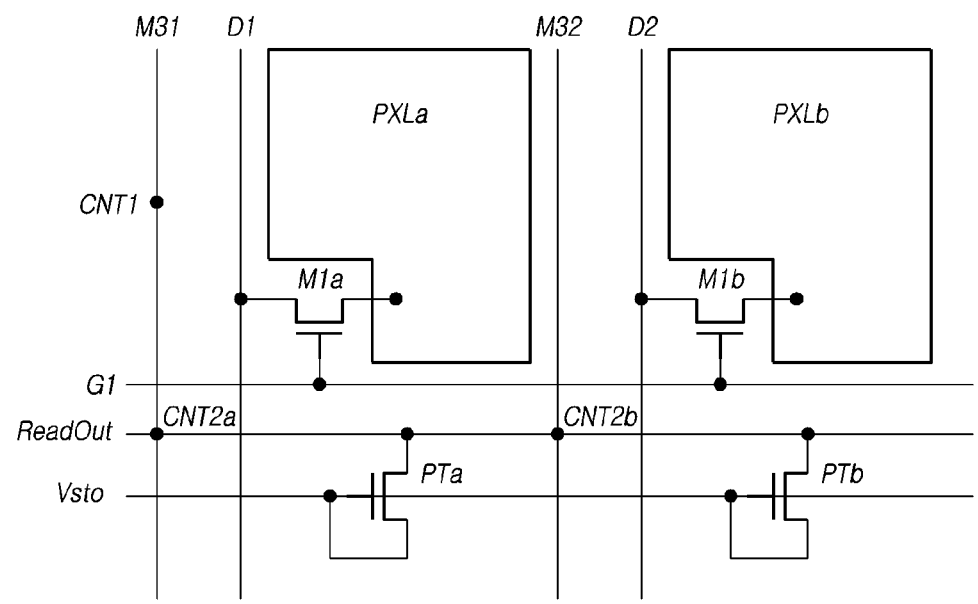
FIG. 3B is a circuit diagram illustrating another aspect of the display device according to the present disclosure.

FIG. 3B is a circuit diagram illustrating an aspect of the display device according to the aspects.

Referring to FIG. 3B, the display device may include data lines (D1 and D2) extending in a first direction and transferring a data signal, and first signal lines (M31 and M32) for transferring a first driving signal and a first sensing signal in parallel to the data lines (D1 and D2). Further, the display device may include a gate line (G1) extending in a second direction and applying a gate signal, a second signal line (ReadOut) parallel to the gate line (G1), and a first power line (Vsto) for transferring a first voltage in parallel to the gate line (G1).

Driving transistors (M1a and M1b) may be arranged in an area at which the data lines (D1 and D2) and the gate line (G1) intersect. Further, the driving transistors (M1a and M1b) may be connected to pixel electrodes (PXLa and PXLb). The pixel electrodes (PXLa and PXLb) are not limited to the illustrated form. First electrodes of the driving transistors (M1a and M1b) may be connected to the data lines (D1 and D2) and second electrodes thereof may be connected to the pixel electrodes (PXLa and PXLb). Further, gate electrodes of the driving transistors (M1a and M1b) may be connected to the gate line (G1).

In addition, the first signal lines (M31 and M32) may be connected to the touch electrode (TE) arranged on the upper part through the first contact hole (CNT1), and the first driving signal may be transferred to the touch electrode (TE) through the first signal lines (M31 and M32). The first sensing signal may be transferred from the touch electrode (TE) to the first signal lines (M31 and M32) according to the first driving signal.

The display device may include photo transistors (PTa and PTb) in which a first electrode and a gate electrode are connected and a second electrode is connected to the second signal line (ReadOut). The photo transistors (PTa and PTb) have a first electrode and a gate electrode connected to each other, and may maintain an off state by receiving a first voltage lower than a threshold voltage of the photo transistors (PTa and PTb) through the first power line (Vsto). However, the photo transistors (PTa and PTb) may be turned on when light is radiated. When the light is radiated and thus the photo transistors (PTa and PTb) are turned on, the current is generated by the photo transistors (PTa and PTb) and the second sensing signal corresponding to the generated current may be transferred to the second signal line (ReadOut). When the second sensing signal is transferred to the second signal line (ReadOut), the voltage of the second signal line (ReadOut) may rise.

The first signal lines (M31 and M32) and the second signal line (ReadOut) may be connected through second contact holes (CNT2a and CNT2b), respectively. Since the first signal lines (M31 and M32) are connected to the second signal line (ReadOut) and the second signal line (ReadOut) is connected to the photo transistors (PTa and PTb), the first sensing signal transferred from the first signal lines (M31 and M32) and the second sensing signal transferred from the photo transistors (PTa and PTb) may be transferred to the second signal line (ReadOut). Further, the second sensing signal transferred to the second signal line (ReadOut) may be transferred to the first signal lines (M31 and M32). The first sensing signal and the second sensing signal transferred to the first signal lines (M31 and M32) may be transferred to the sensing driver IC 130.

Figure 4A:
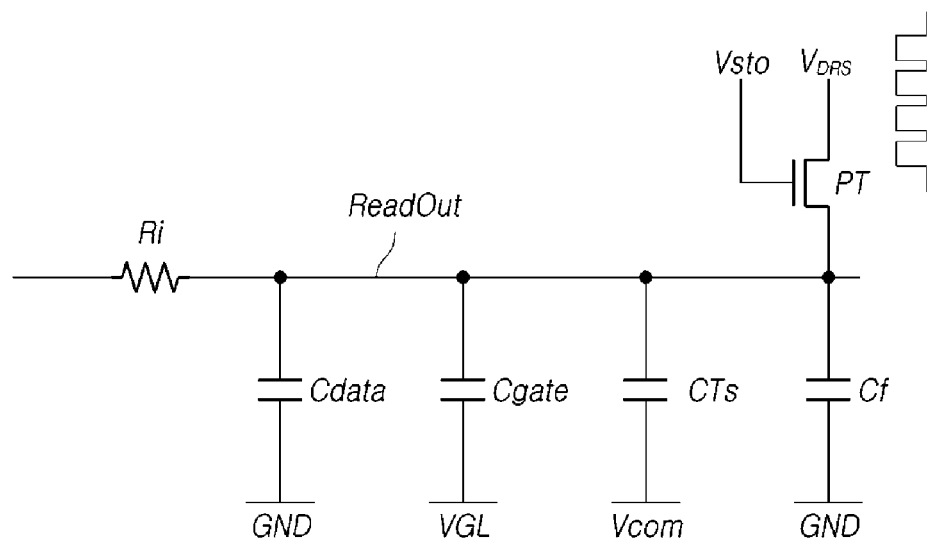
FIG. 4A is a circuit diagram illustrating an aspect of the display according to present disclosure.
Figure 4B:
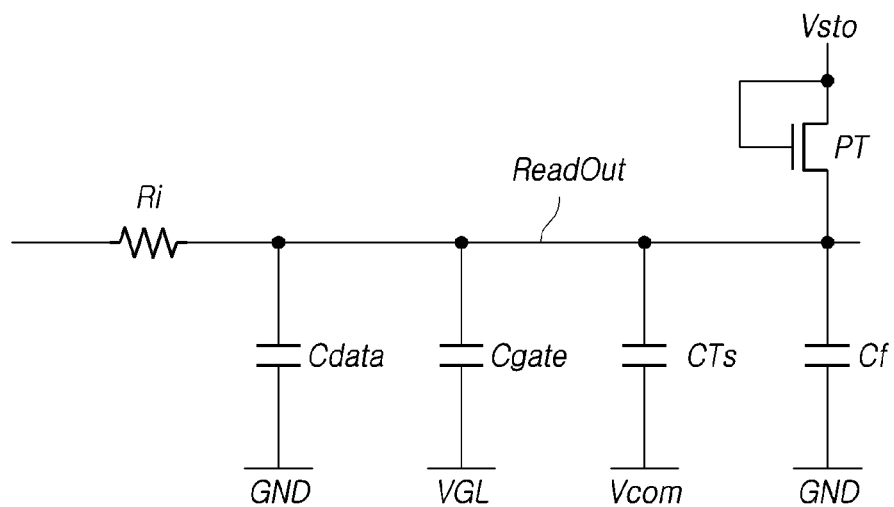
FIG. 4B is a circuit diagram illustrating an aspect of the display device according to the present disclosure.

FIGS. 4A and 4B are circuit diagrams illustrating aspects of the display device according to the present disclosure.

Referring to FIG. 4A, a first capacitor (Cdata) formed by the data line, a second capacitor (Cgate) formed by the gate line, a third capacitor (CTs) formed between the touch electrode and the pixel electrode, and a touch capacitor (Cf) generated by a finger, which touches the touch electrode, may be formed on the second signal line (ReadOut) arranged on the display device, wherein the other side of the above-mentioned capacitors are respectively connected to the ground (GND), the gate signal (VGL), and a common electrode (Vcom). And a resistor (Ri) is a line resistor for the the second signal line (ReadOut). Accordingly, when the touch electrode is not touched, the touch capacitor (Cf) does not exist. When the touch electrode is touched, the touch capacitor (Cf) is generated. When the touch electrode is touched and thus the touch capacitor (Cf) is generated, voltages charged to the first capacitor (Cdata), the second capacitor (Cgate), and the third capacitor (CTs) may be transferred to the touch capacitor (Cf) and the voltage charged to the capacitor is changed, so that the touch can be recognized.

Further, a photo transistor (PT) may be connected to the second signal line (ReadOut). The photo transistor (PT) may receive the second driving signal through the first electrode and the gate electrode may receive the first voltage through the first power line (Vsto). Since the first voltage is a voltage lower than the threshold voltage of the photo transistor (PT), the photo transistor (PT) may maintain an off state. However, when light is radiated, the photo transistor (PT) is turned on and the second driving signal is transferred, and thus a second sensing signal corresponding to the second driving signal may be transferred to the second signal line (ReadOut). Accordingly, the sensing driver IC 130 may generate a sensing voltage corresponding to the second sensing signal based on the voltage transferred through the second signal line (ReadOut).

Further, the display device illustrated in FIG. 4B is different from the display device illustrated in FIG. 4A in that the first electrode and the gate electrode of the photo transistor (PT) are connected to the first power line (Vsto) and the second electrode is connected to the second signal line (ReadOut). Accordingly, the display device in FIG. 4B does not include the third signal line ($V_{DRS}$), thereby further increasing an opening rate.

Figure 5A:
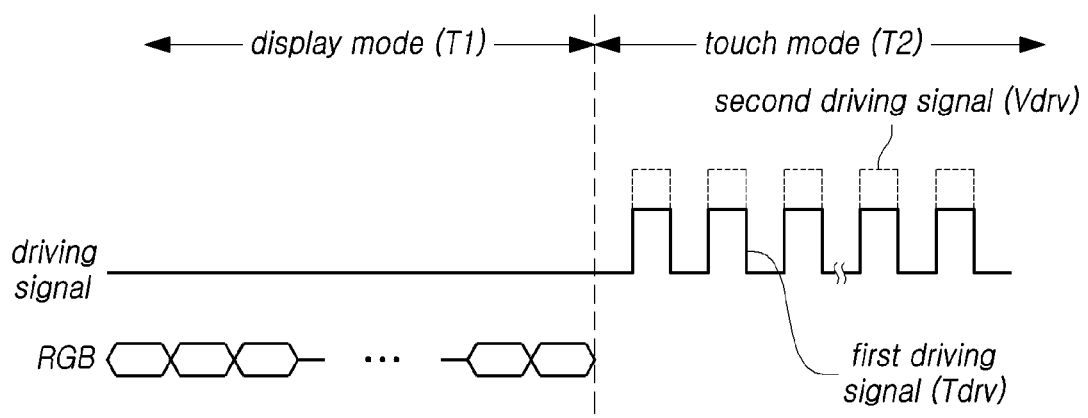
FIG. 5A is a timing diagram illustrating an aspect of a driving method of the display device according to the present disclosure.
Figure 5B:
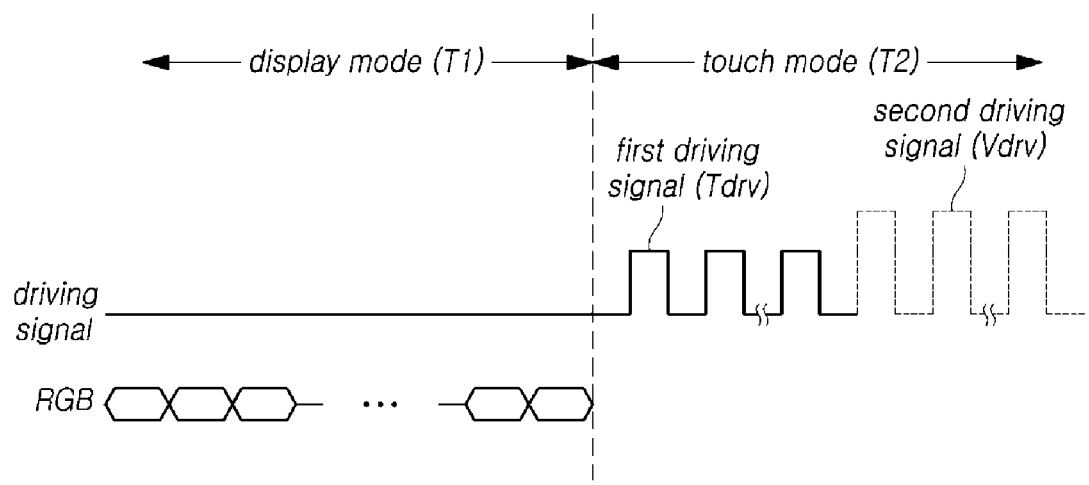
FIG. 5B is a timing diagram illustrating another aspect of a driving method of the display device according to the present disclosure.

FIGS. 5A and 5B are timing diagrams illustrating aspects of a driving method of a display device according to the present disclosure.

Referring to FIG. 5A, the display device may separately operate in a display mode (T1) and a touch mode (T2). The separate operations of the display device in the display mode (T1) and the touch mode (T2) may be respectively performed by the first controller 140 and the second controller 150 illustrated in FIG. 1. In the display mode (T1), the first driving signal (Tdrv) for driving the touch electrode (TE) and the second driving signal (Vdrv) for driving the photo transistor (PT) sensing radiation of light are not transmitted. Further, in the display mode (T1), an image signal (RGB) may be supplied and a data signal may be transferred to the data line according to the image signal, and thus the display panel may display an image.

In the touch mode (T2), the image signal (RGB) may not be supplied and the first driving signal (Tdrv) and the second driving signal (Vdrv) may be transmitted. The first driving signal (Tdrv) and the second driving signal (Vdrv) may be synchronized but voltage levels thereof may be different. Further, the voltage level of the second driving signal (Vdrv) may be higher than that of the first driving signal (Tdrv).

As illustrated in FIG. 5B, the first driving signal (Tdrv) and the second driving signal (Vdrv) may be sequentially generated. The voltage levels of the first driving signal (Tdrv) and the second driving signal (Vdrv) may be different. Further, the voltage level of the second driving signal (Vdrv) may be higher than that of the first driving signal (Tdrv).

However, the present disclosure is not limited thereto, and the image signal may be transmitted in the display mode (T1) and only the first driving signal may be transmitted in the touch mode (T2). In this case, the photo transistor (PT) may not receive the second driving signal but may have leakage current when light is radiated.

Figure 6A:
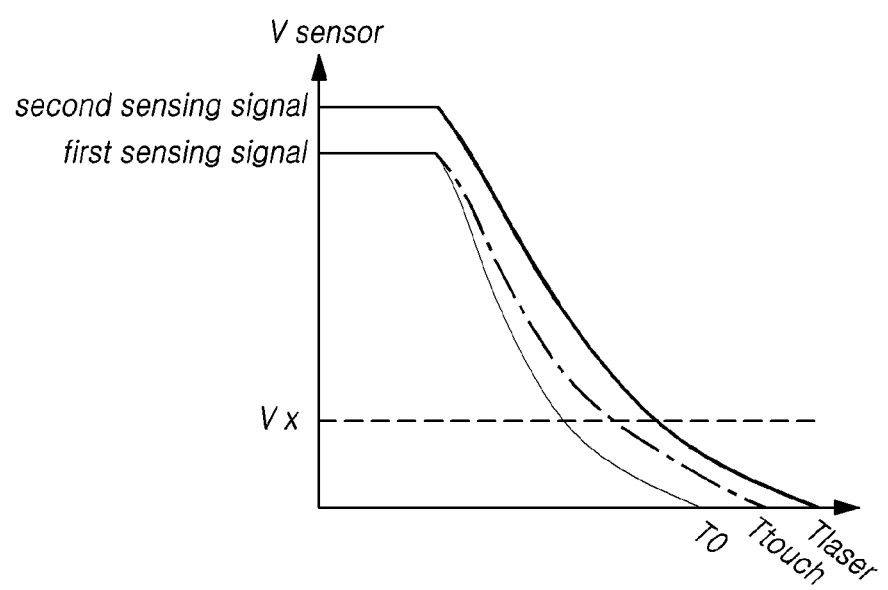
FIG. 6A is a graph illustrating a sensing voltage in the display device according to the present disclosure.

FIG. 6A is a graph illustrating a sensing voltage in the display device according to the present disclosure.

Referring to FIG. 6A, the touch electrode may receive the first driving signal and the photo transistor may receive the second driving signal.

Since light is not radiated, the first sensing signal corresponding to the first driving signal (Tdrv) may be transferred to the second signal line (ReadOut). Further, the sensing voltage may be generated in the sensing driver IC 130 by the first sensing signal. When no touch is generated, the sensing voltage may be lowered to a preset voltage (Vx) after a first time (T0) passes. However, when touch is generated, a delay may be generated by the generated touch capacitor (Cf), and thus the sensing voltage may be lowered to a preset voltage (Vx) after a second time (Ttouch) passes.

When light is radiated and the second sensing signal corresponding to the second driving signal is transferred to the second signal line (ReadOut), the voltage of the second sensing signal may be lowered to a preset voltage (Vx) after a third time (Tlaser), which is longer than the second time (Ttouch), passes. That is, the sensing voltage may be delayed by the touch and the radiation of light.

Whether there is a touch and light is radiated may be sensed based on a delayed time difference. That is, it may be determined that there are no touch and radiation of light when the delay time corresponds to the first time (T0), and it may be determined that there is a touch when the delay time corresponds to the second time (Ttouch). When the delay time corresponds to the third time (Tlaser), it may be determined that light is radiated.

Figure 6B:
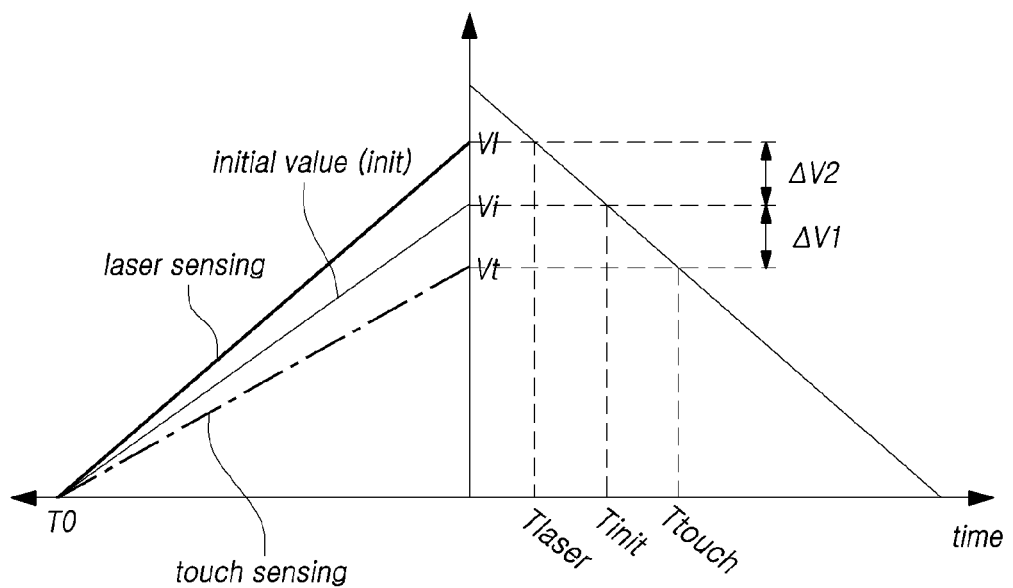
FIG. 6B is a graph illustrating a sensing voltage in the display device according to the present disclosure.

FIG. 6B is a graph illustrating a sensing voltage in the display device according to the present disclosure.

Referring to FIG. 6B, the touch electrode may receive the first driving signal and the photo transistor may have the first electrode and the gate electrode connected to each other and receive the first voltage through the first power line (Vsto). The first electrode and the gate electrode of the photo transistor may receive the first voltage, which is lower than the threshold voltage, and thus the photo transistor may be in an off state.

When light is not radiated, the photo transistor (PT) remains in the off state. Further, a first sensing signal corresponding to the first driving signal may be transferred to the second signal line (ReadOut). When there is no touch, the voltage (Vi) of the second signal line (ReadOut) may increase at a predetermined inclination. The inclination may correspond to Equation (1) below.

$$Slop = i_{init}/C_{init} \qquad \text{Equation (1)}$$

In Equation (1), slop refers to an inclination, $i_{init}$ refers to an initial current amount, and $C_{init}$ refers to initial capacitance of a capacitor.

When a touch is generated, the touch capacitor (Cf) is generated and the voltage (Vt) of the second signal line (ReadOut) may correspond to Equation (2) below.

$$Slop = \frac{i_{init}}{(C_{init} + Cf)} \qquad \text{Equation (2)}$$

In Equation (2), slop refers to an inclination, $i_{init}$ refers to an initial current amount, $C_{init}$ refers to initial capacitance of a capacitor, and Cf refers to a touch capacitor generated by a touch.

A speed at which the voltage (Vt) of the second signal line (ReadOut) is increased by the touch capacitor (Cf) decreases and the inclination may decrease compared to the case in which the touch is generated.

However, when light is radiated, the photo transistor (PT) may be turned on. When the photo transistor (PT) is turned on, leakage current flows from the photo transistor (PT) to the second signal line (ReadOut) and the voltage of the second signal line (ReadOut) increases. Accordingly, the voltage of the second signal line (ReadOut) may correspond to Equation (3) below.

$$Slop = \frac{(i_{init} + i_{laser})}{C_{init}} \qquad \text{Equation (3)}$$

In Equation (3), slop refers to an inclination, $i_{init}$ refers to an initial current amount, $i_{laser}$ refers to an amount of a leakage current flowing from the photo transistor (PT) to the second signal line (ReadOut), and $C_{init}$ refers to initial capacitance of a capacitor.

Accordingly, a speed, at which the voltage of the second signal line (ReadOut) increases, increases and the inclination may increase compared to the case in which the touch is generated.

Further, in accordance with the inclination, a difference (ΔV1) between an initial voltage (Vi) and a voltage generated by a touch and a difference (ΔV2) between the initial voltage (Vi) and a voltage increased by a leakage current generated by radiated light may be detected.

In addition, it may be determined whether a touch is generated or light is radiated by measuring a speed which the voltage of the second signal line (ReadOut) reaches.

Figure 7:
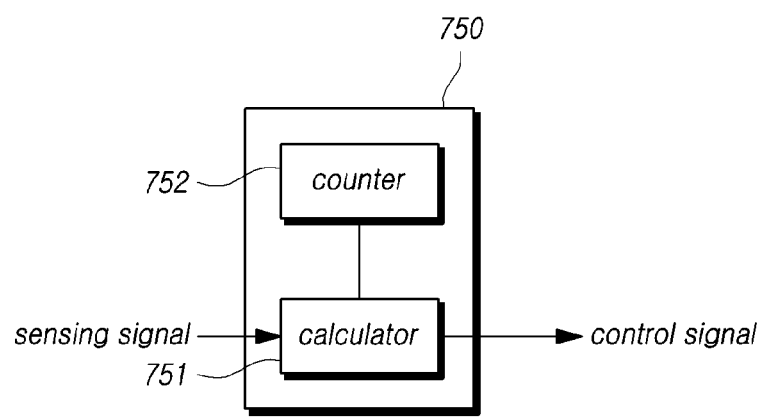
FIG. 7 is a schematic diagram illustrating an aspect of a second controller employed by the display device according to the present disclosure.

FIG. 7 is a diagram illustrating a structure of a second controller employed by the display device according to an aspect of the present disclosure.

Referring to FIG. 7, a second controller 750 may include a calculator 751 and a counter 752. The calculator 751 may receive a sensing signal. The sensing signal may correspond to a voltage applied to the second signal line (ReadOut). The calculator 751 may generate a control signal through the counter 752.

The counter 752 may be a clock counter, and may generate a counter clock and transfer the generated counter clock to the calculator 751. The calculator 751 may detect the delay time or voltage increase time of FIG. 6A or 6B based on the counter clock. Accordingly, the calculator 751 may determine whether a touch is generated or light is radiated.

Figure 8:
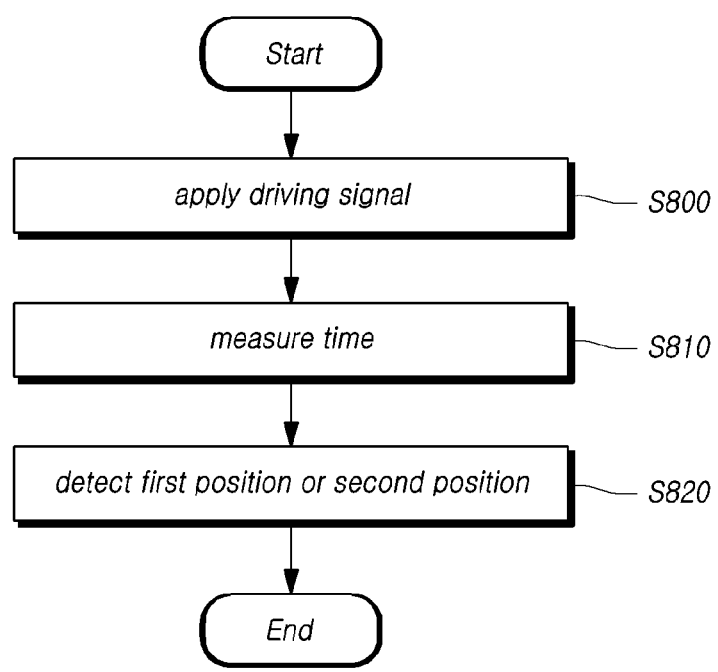
FIG. 8 is a flowchart illustrating an aspect of a sensing method of detecting a touch in the display device according to the present disclosure.

FIG. 8 is a flowchart illustrating an aspect of a sensing method of detecting a touch in the display device according to the present disclosure.

Referring to FIG. 8, in the sensing method, a driving signal may be applied in S800. The driving signal may include at least one of a first driving signal for driving a touch electrode and a second driving signal for driving a photo transistor, and the second controller 150 illustrated in FIG. 1 may transfer the first driving signal and/or the second driving signal so as to drive the touch electrode and the photo transistor. A first voltage is applied to a gate electrode and thus the photo transistor remains in an off state, and when light is radiated, may be turned on. When light is radiated, the photo transistor may operate even though the second driving signal is not received according to an aspect. When the touch is generated and light is radiated, the touch electrode and the photo transistor may output a first sensing signal and a second sensing signal, respectively. A voltage level of the first driving signal and a voltage level of the second driving signal may be different from each other. Further, the voltage level of the second driving signal may be higher than the voltage level of the first driving signal.

The touch electrode may be a common electrode of the display panel. The touch may be a touch by a hand or a device such as a stylus pen, and the radiated light may be light projected onto the display panel by a device such as a laser pointer. However, the present disclosure is not limited thereto.

When the first sensing signal and/or the second sensing signal are output, sensing voltages may be generated in accordance with the first sensing signal and/or the second sensing signal. Since the voltage level of the first driving signal and the second voltage level of the second driving signal are different from each other, voltage levels of the first sensing signal and the sensing signal may be different from each other. Further, the voltage level of the second sensing signal may be higher than the voltage level of the first sensing signal.

A time may be measured in accordance with the sensing voltage in S810. When the touch is generated, a touch capacitor is generated and a sensing voltage is delayed by the touch capacitor. Accordingly, it may be determined whether the touch is generated by measuring the time during which the sensing voltage is delayed. Since the voltage level of the second sensing signal, which is generated by the radiated light, is different from the voltage of the first sensing signal, when the sensing voltage is generated in accordance with the second sensing signal, a speed at which the sensing voltage is delayed may be different from that at which the sensing voltage is generated by the first sensing signal. When the voltage of the second sensing signal is higher than the voltage of the first sensing signal, the delay time may become longer. Accordingly, the time may be measured in accordance with the sensing voltage.

When the second driving signal is not generated, a time during which the voltage rises in accordance with the sensing signal may be measured and a time corresponding to the sensing voltage may be measured based on the measured time. When the touch is generated, a time during which a current is flowed by the touch capacitor becomes shorter, so that a time during which the voltage rises is longer than that in the case in which no touch is generated, but when light is radiated and a leakage current is generated by the photo transistor, an amount of the flowing current becomes larger and thus the time during which the voltage rises may become shorter. The time during which the voltage rises may be measured.

The measurement of time may be performed using a counter clock generated by a clock counter.

The second controller 150 may detect a first position or a second position based on the delay time in S820. The first position may be a position corresponding to the first sensing signal and the second position may be a position corresponding to the second sensing signal. The second controller 150 may sense the first position or the second position based on a time during which the voltage rises.

The second controller 150 may differentiate between the first sensing signal and the second sensing signal in accordance with the time during which the sensing voltage is delayed, and sense the first position or the second position according to the differentiation. The second controller 150 may differentiate between the first sensing signal and the second sensing signal in accordance with the time during which the sensing voltage rises, and sense the first position or the second position according to such differentiation.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display device comprising:
   a display panel including a plurality of pixels;
   a first sensing unit configured to detect a touch on the display panel and output a first sensing signal;
   a second sensing unit configured to detect light on the display panel and output a second sensing signal;
   a sensing driver IC configured to output the first sensing signal and the second sensing signal received from the first sensing unit and the second sensing unit as sensing voltages; and
   a controller configured to differentiate between the sensing voltages received from the sensing device IC and the first sensing signal and the second sensing signal,
   wherein the controller measures a delay time of the sensing voltage and determines whether the sensing voltage corresponds to the first sensing signal or the second sensing signal.

2. The display device of claim 1, wherein the first sensing unit includes a touch electrode receiving a first driving signal and outputting the first sensing signal.

3. The display device of claim 1, wherein the second sensing unit includes a photo transistor receiving a second driving signal and outputting the second sensing signal when the light is detected.

4. The display device of claim 1, wherein the controller measures a time during which the sensing voltage rises and determines whether the sensing voltage corresponds to the first sensing signal or the second sensing signal.

5. The display device of claim 2, wherein the display panel separately operates in a display mode and a touch mode, and the touch electrode receives the first driving signal in the touch mode.

6. The display device of claim 2, wherein the display panel separately operates in a display mode and a touch mode, and the touch electrode receives the first driving signal and the photo transistor receives the second driving signal in the touch mode.

7. The display device of claim 2, wherein the touch electrode functions as a common electrode of the display panel.

8. The display device of claim 1, wherein the controller includes a calculator receiving the first and second sensing signals and a counter generating a counter clock and transferring the generated counter clock to the calculator.

9. The display device of claim 8, wherein the calculator generates a control signal through the counter.

10. The display device of claim 8, wherein the calculator detects a delay time or a voltage increase time through the counter clock.

11. The display device of claim 8, wherein the calculator determines whether a touch is generated or light is radiated on the display panel.

12. A display panel comprising:
    a plurality of pixels configured to display an image in accordance with voltages applied to a first electrode and a second electrode;
    a first signal line configured to transfer a first driving signal to the second electrode and receive a first sensing signal corresponding to the first driving signal from the second electrode;
    a second signal line connected to the first signal line and a photo transistor and configured to receive a second sensing signal from the photo transistor; and
    wherein the display panel separately operates in a display mode and a touch mode, and the second electrode and the photo transistor receive the first driving signal and the second driving signal, respectively, in the touch mode,
    wherein the second driving signal is synchronized with the first driving signal in the touch mode, and the first driving signal and the second driving signal have voltage levels different from each other.

13. The display panel of claim 12, wherein the photo transistor includes a first electrode and a gate electrode connected to a first power line for supplying a first voltage, and a second electrode connected to the second signal line.

14. The display panel of claim 12, further comprising a third signal line transmitting a second driving signal, wherein the photo transistor includes a first electrode connected to the third signal line, a gate electrode connected to a first power line for supplying a first voltage, and a second electrode connected to the second signal line.

15. A sensing method of detecting a touch and light by a sensing unit comprising a touch electrode and a photo sensor, the sensing method comprising:
    generating sensing voltages in accordance with a first sensing signal corresponding to a touch and a second sensing signal corresponding to light; detecting the sensing voltages; and identifying a touch by differentiating between the first sensing signal and the second sensing signal through the detected sensing voltages, wherein the identifying of the touch includes differentiating between the first sensing signal and the second sensing signal in accordance with a time during which the sensing voltages are delayed.

16. A sensing method of detecting a touch and light by a sensing unit comprising a photo sensor, the sensing method comprising:

generating sensing voltages in accordance with a first sensing signal corresponding to a touch and a second sensing signal corresponding to light; detecting the sensing voltages; and identifying a touch by differentiating between the first sensing signal and the second sensing signal through the detected sensing voltages, wherein the identifying of the touch includes differentiating between the first sensing signal and the second sensing signal in accordance with a time during which the sensing voltages rise.

* * * * *